United States Patent

[11] 3,602,520

| [72] | Inventor | Rolland B. Wallis<br>La Grange Park, Ill. |
|---|---|---|
| [21] | Appl. No. | 770,741 |
| [22] | Filed | Oct. 25, 1968 |
| [45] | Patented | Aug. 31, 1971 |
| [73] | Assignee | General Motors Corporation<br>Detroit, Mich. |

[54] PRESSURE BALANCED RECIPROCATING SHAFT SEAL
3 Claims, 3 Drawing Figs.

[52] U.S. Cl. .................................................... 277/27,
 277/142, 277/143
[51] Int. Cl. .................................................... F16j 15/16,
 F16k 41/00
[50] Field of Search .......................................... 277/27, 99,
 98, 119, 142, 143, 165, 178

[56] References Cited
UNITED STATES PATENTS

| 210,504 | 12/1878 | Davis | 277/99 |
|---|---|---|---|
| 2,847,236 | 8/1958 | Lazar | 277/98 |
| 3,149,846 | 9/1964 | Verbeek | 277/27 |

*Primary Examiner*—Samuel B. Rothberg
*Attorneys*—J. L. Carpenter, W. F. Wagner and Robert J. Outland ABSTRACT: A reciprocating shaft seal having a deformable shaft-engaging portion, which may be acted upon by varying fluid pressures so as to change the shaft-engaging force, is provided with preloading means which are also acted on by the fluid pressures to reduce the preload when the direct pressure load is increased, thereby diminishing, or completely balancing, the effect of fluid pressure changes on the engaging force of the shaft-engaging portion.

PATENTED AUG 31 1971 3,602,520
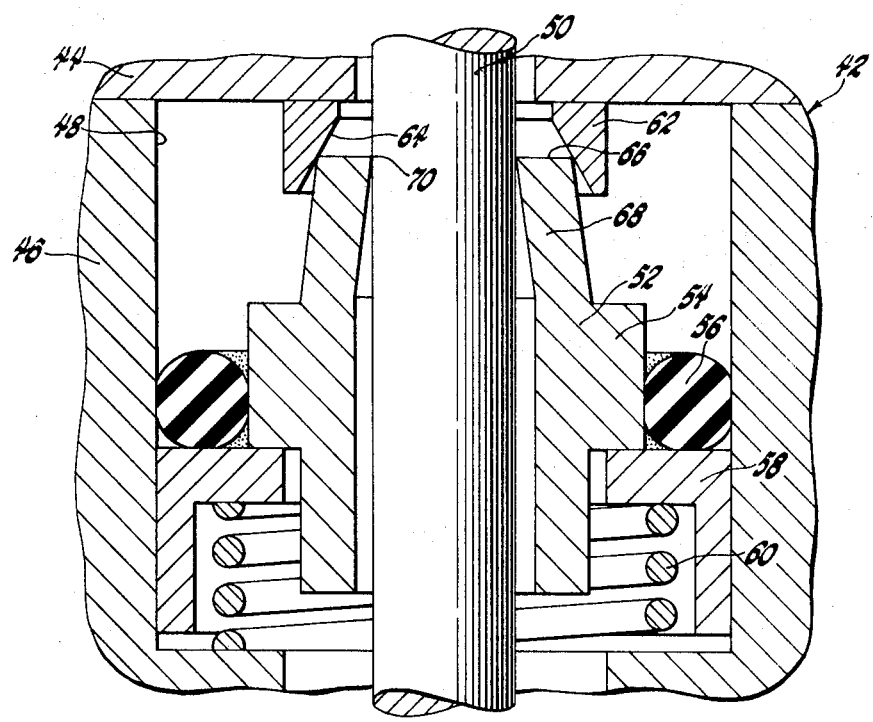
Fig.1
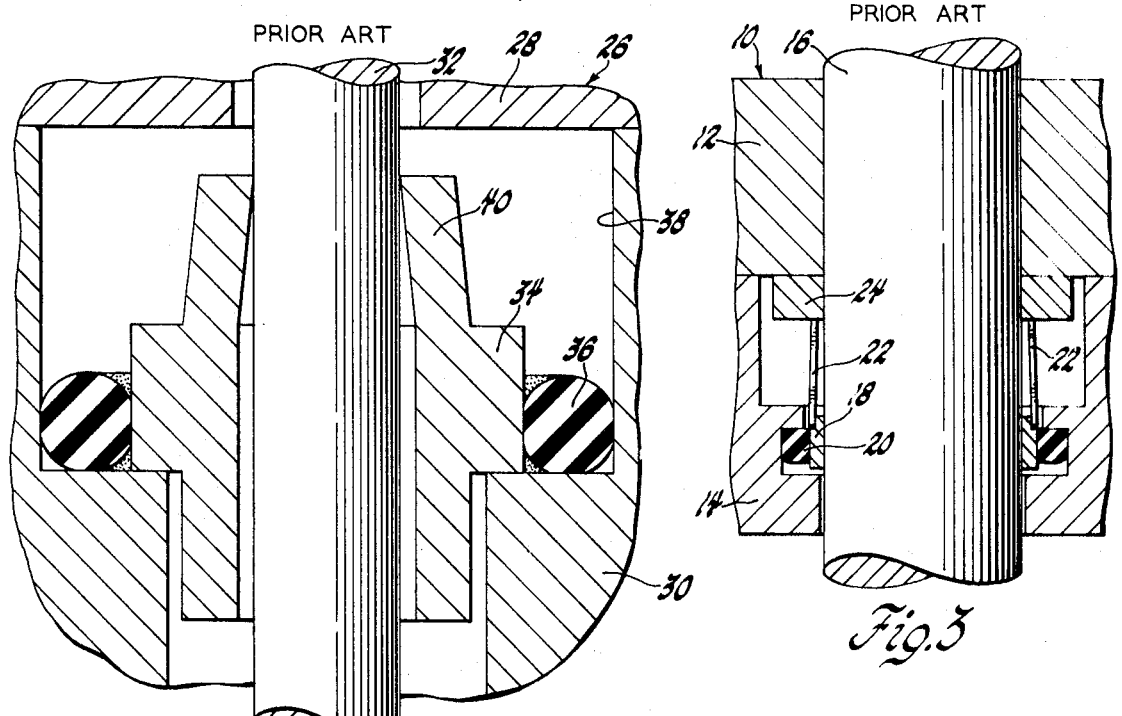
Fig.2 PRIOR ART
Fig.3 PRIOR ART
INVENTOR.
Rolland B. Wallis
BY
Robert J. Outland
ATTORNEY

PRESSURE BALANCED RECIPROCATING SHAFT SEAL

FIELD OF THE INVENTION

This invention relates to means for sealing reciprocating shafts and more particularly to reciprocating shaft seals having means for balancing the effect of varying pressures applied thereto. In a preferred form, the invention contemplates the application of pressure balancing means arranged to permit some flow of fluid in one direction while preventing substantial flow in the other.

DESCRIPTION OF THE PRIOR ART

Among the various types of reciprocating shaft seals disclosed in the prior art are those shown in British Pat. No. 966,561 published Aug. 12, 1964. These include various arrangements utilizing a deformable sleeve surrounding a shaft and acted upon by a spring or fluid pressure so as to conically deform the sleeve into engagement with the shaft and form a seal which substantially prevents fluid flow in one direction while permitting the free passage of and even causing pumping of fluid through the seal in the other direction. For a complete disclosure of the construction and operation of such seals, reference is made to the above-mentioned British patent, the disclosure of which is hereby incorporated into this application.

It has been found that in certain applications reciprocating shaft seals of the general type above referred to are subject to substantial pressures, and in some cases substantial variations in those pressures, which have an effect on the force of engagement of the seal member upon the shaft and may therefore adversely affect the wear rate of the seal and shaft combination.

SUMMARY OF THE INVENTION

The present invention proposes means by which the effect of fluid pressures acting on deformable shaft seal members may be balanced out or otherwise modified in a desirable manner. While the invention is primarily intended for use in deformable sleeve-type seals of a type similar to those disclosed in the above-mentioned British application and used, for example, to seal the connecting rods of hot gas engines, it is realized that the inventive concept may be equally applicable to other types of shaft seals and it is thus not desired to limit the possible application of the invention.

In essence, the invention contemplates the use of mechanical preloading means for applying a predetermined initial engaging force to urge the seal member into contact with the reciprocating shaft. The mechanical means are arranged to be responsive to fluid pressures which act upon the seal in a manner that would otherwise increase the seal engaging force so that the mechanical initial engaging force is decreased, tending to balance the effect of the fluid pressures and hold the seal engaging force constant or, if desired, provide for modifying the force upwardly or downwardly in the degree desired.

A full understanding of the invention and its mode of operation may be gained from the following description of a preferred embodiment taken together with the accompanying drawing.

BRIEF DESCRIPTION OF THE DRAWING

In the drawing, FIG. 1 is a cross-sectional view of reciprocating shaft mechanism including pressure balanced shaft seal means formed according to the invention;

FIG. 2 is a cross-sectional view showing mechanism including a prior art form of seal means similar to that of FIG. 1 but not including pressure balancing means; and FIG. 3 is a cross-sectional view illustrating mechanism including another form of prior art seal means.

DESCRIPTION OF THE PREFERRED EMBODIMENT

Referring first to FIG. 3 of the drawing, there is shown a prior art reciprocating shaft mechanism generally indicated by numeral 10. The arrangement shown in the one illustrated in FIG. 3 of the above-mentioned British Pat. No. 966,561 and comprises a housing formed of upper and lower members 12 and 14 respectively which receive a reciprocable shaft 16. Seal mans are provided for the shaft, including a sleeve member 19 which is surrounded by a resilient ring 20 and is deformed at its upper edge by the action of a plurality of blade springs 22 seated in a retaining ring 24.

The action of the seal is to prevent the downward movement of lubricating fluid past the upper edge of the sleeve member 18 while any fluid which may be present on the shaft below the sleeve member is permitted to slide upwardly in a wedgelike action past the sleeve member and into the upper portion of the shaft where it belongs.

FIG. 2 discloses another prior art arrangement of mechanism generally indicated by numeral 26. This arrangement also includes a housing formed of upper and lower members 28 and 30 respectively in which a reciprocable shaft 32 is supported by means not shown. The seal means provided include an elongated sleeve member 34 which has an enlarged central portion engaging a resilient ring 36 which seats against the wall of the seal cavity 38. A portion of the housing also supports the sleeve member, the upper portion 40 of which is conically deformed before assembly so that in assembly it engages the shaft 32.

In this arrangement, the initial engaging force of the seal is determined by the degree of deformation before assembly. Auxiliary spring means such as springs 22 of FIG. 3 are not used.

In both arrangements the existence of substantial fluid pressures in the portion of the seal cavity above and surrounding the respective sleeve members will result in an inward component of force a acting on the sleeve members and increasing the engaging force of the sleeves on the shafts over that which is initially provided. In applications where substantial pressures are encountered, this increase in force can cause excessive wear of the seal sleeve and the shaft.

Referring now to FIG. 1, mechanism including a novel seal arrangement according to the invention is shown as generally indicated by numeral 42. This arrangement, like those previously described, includes a housing having upper and lower members 44 and 46 respectively which define a seal cavity 48 and receive a reciprocable shaft 50.

Within cavity 48 is disposed a sleeve member 52 having an enlarged central portion 54 engaged on its outer diameter by a resilient ring 56 which in turn engages the outer wall of the seal cavity generally in the manner of the arrangement of FIG. 2. Here the similarity ends, however, for both the ring 56 and the enlarged central portion 54 are supported by a guide member 58 which is reciprocably movable vertically as shown in the drawing within the seal cavity 48. A large coil spring 60 acts between a lower wall of the housing member 46 and the guide member 58 so as to urge the guide member upwardly, in turn forcing sleeve 52 upwardly into engagement with a seat ring 62. Ring 62 is provided with a conical surface 64 which engages the squared end 66 of the upper portion 68 of sleeve 52, causing the sharp inner edge 70 of the seal sleeve to be forced into engagement with the shaft 50.

In operation the spring 60 creates a predetermined initial upward force on sleeve 52 which is converted by surface 64 into an initial inward force urging edge 70 of the seal sleeve into engagement with shaft 50. If the fluid pressure in the upper portion of cavity 48 increases, it acts against the outer surface of upper sleeve portion 68 causing an additional inward force. However, at the same time, this pressure acts downwardly on the enlarged central portion 54 of the sleeve as well as on the resilient ring 56, transferring a downward force to guide member 58 and thereby effectively reducing the spring force transmitted to the sleeve member 52. In this way, the mechanical preload force is reduced as the fluid pressure caused engaging force is increased. Thus, if the proper relative areas are present, these changes in force will offset one another, giving the same engaging force of the seal edge 70 on the shaft 50 under all pressure conditions. If desired, however, the areas can be predetermined to give either an increase or a decrease in engaging force in response to an increase in fluid pressure in the cavity 48.

The result is that as the shaft reciprocates, the sharp edge 70 prevents substantial movement downwardly of lubricant or other liquids but permits a wedge action to occur, allowing lubricant flow upward past the edge 70 in the same manner as occurs with the prior art arrangements of FIGS. 2 and 3. However, the variations in pressure in cavity 48 will have little effect on the engaging force of the seal on the shaft and thus will not adversely affect the wear life of the components.

I claim:

1. In combination with a pair of relatively reciprocable elements comprising a housing and a shaft carried therein, a shaft seal between said housing and said shaft and separating the interior of said housing into first and second chambers, said seal being adapted to substantially prevent fluid movement in one direction between said chambers but to permit fluid movement in the opposite direction between said chambers, said seal comprising a sleeve member having an elastically deformable generally cylindrical portion closely surrounding said shaft and terminating in a sharp edge engageable with said shaft, said cylindrical portion being exposed to fluid pressure in one of said chambers whereby said edge is urged into such engagement, a closing ring having a conical surface disposed in engagement with the end of said sleeve member adjacent said sharp edge and responsive to an axial force urging said ring and sleeve members together to force said sharp edge inwardly against said shaft and preloading means acting between said housing and one of said sleeve and closing ring members so as to axially urge together said sleeve and closing ring, said preloading means in combination with said one of said sleeve and closing ring members having a surface in said one chamber exposed to axially directed pressures which oppose the action of said preloading means, whereby an increase in pressure on said one chamber reduces the force by which said preloading means urge together said sleeve and closing ring so as to at least in part balance the increase in the engaging force caused by the action of said fluid pressure on said sleeve member cylindrical portion.

2. The combination claim 1 wherein said preloading means comprises a spring as well as an annular guide member slidably disposed for axial movement in said housing and engaging both said sleeve member and said spring, said guide member acting to transmit the force of said spring to said sleeve member and to transmit to said spring the axial force of fluid pressure in said one chamber acting on said sleeve member.

3. The combination of claim 2 wherein said seal further comprises a resilient annular ring engaging an outer surface of said sleeve member and an inner surface of said housing and sealing the clearance between them so as to aid in the prevention of fluid flow between said first and second chambers, said annular guide member being engaged by and supporting said resilient ring against the force thereon of fluid pressure in said one chamber and acting further to transmit such force to said spring.